(12) United States Patent
Horsch et al.

(10) Patent No.: US 11,974,518 B2
(45) Date of Patent: May 7, 2024

(54) SINGULATION DEVICE FOR SINGULATING GRAINS ON THE BASIS OF A PRESSURE DIFFERENCE, METHOD FOR SINGULATING GRAINS, AND AGRICULTURAL ROW UNIT

(71) Applicant: Horsch Maschinen GmbH, Schwandorf (DE)

(72) Inventors: Philipp Horsch, Schwandorf (DE); Manfred Köbler, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 792 days.

(21) Appl. No.: 17/259,104

(22) PCT Filed: Dec. 20, 2018

(86) PCT No.: PCT/EP2018/086245
§ 371 (c)(1),
(2) Date: Jan. 8, 2021

(87) PCT Pub. No.: WO2020/011386
PCT Pub. Date: Jan. 16, 2020

(65) Prior Publication Data
US 2021/0315152 A1    Oct. 14, 2021

(30) Foreign Application Priority Data
Jul. 10, 2018 (DE) .......................... 102018116639.7

(51) Int. Cl.
*A01C 7/04* (2006.01)
*A01C 7/08* (2006.01)
*A01C 7/12* (2006.01)

(52) U.S. Cl.
CPC ............ *A01C 7/128* (2013.01); *A01C 7/0443* (2023.05); *A01C 7/081* (2013.01)

(58) Field of Classification Search
CPC ..... A01C 7/046; A01C 7/0446; A01C 7/0445; A01C 7/0443; A01C 7/044; A01C 7/04;
(Continued)

(56) References Cited

U.S. PATENT DOCUMENTS

2014/0182495 A1\* 7/2014 Wendte .................. A01C 7/102
111/14
2015/0216107 A1\* 8/2015 Wendte .................. A01C 7/102
111/174
(Continued)

FOREIGN PATENT DOCUMENTS

DE   102007062967 A1   6/2009
EP       0037775 A1    3/1981
(Continued)

*Primary Examiner* — Jamie L McGowan
(74) *Attorney, Agent, or Firm* — AVEK IP, LLC; Kent R. Erickson

(57) ABSTRACT

A device for an for singulating grains based on a pressure difference comprises a chamber for receiving the grains, and a rotatable singulation element. The chamber is delimited in one direction by the singulation element and grains are transported from the chamber to a dispensing region by the singulation element. A first compressed air supply supplies compressed air to the chamber in order to generate at least one pressure difference. The singulation element has a plurality of recesses and the grains can be held in the recesses due to the pressure difference. Individualized grains are dispensed into a grain line in the dispensing region. A second compressed air supply is provided in order to prevent a flow of air out of the chamber into the grain line and in order to transport the grains through the grain line in an accelerated manner by the compressed air.

30 Claims, 7 Drawing Sheets

(58) Field of Classification Search
CPC ......... A01C 7/042; A01C 7/206; A01C 7/205;
A01C 7/166; A01C 7/128; A01C 7/081
See application file for complete search history.

(56) References Cited

U.S. PATENT DOCUMENTS

| | | | |
|---|---|---|---|
| 2018/0310468 A1* | 11/2018 | Schoeny | A01C 7/206 |
| 2019/0239425 A1* | 8/2019 | Garner | A01C 7/206 |
| 2021/0185893 A1* | 6/2021 | Johnson | A01C 7/128 |
| 2021/0185902 A1* | 6/2021 | Johnson | A01C 7/20 |
| 2023/0320257 A1* | 10/2023 | Johnson | A01C 7/082 |

FOREIGN PATENT DOCUMENTS

| | | | | |
|---|---|---|---|---|
| EP | 37775 A | * | 10/1981 | ............. A01C 7/046 |
| EP | 3050419 A1 | | 1/2016 | |
| UA | 34858 A | | 3/2001 | |
| WO | 2010059101 A1 | | 5/2010 | |
| WO | 20150149728 A1 | | 10/2015 | |

* cited by examiner

SINGULATION DEVICE FOR SINGULATING GRAINS ON THE BASIS OF A PRESSURE DIFFERENCE, METHOD FOR SINGULATING GRAINS, AND AGRICULTURAL ROW UNIT

CROSS-REFERENCE TO RELATED APPLICATION

This application claims priority from German patent application No. DE 10 2018 116 639.7 filed Jul. 10, 2018, the disclosure of which is hereby incorporated herein in its entirety by reference.

FIELD OF THE INVENTION

The invention relates to a singulation device (metering device), in particular for mounting on an agricultural row unit and/or for singulating grains (for example seed, fertilizer or other material to be distributed, etc.) on the basis of a pressure difference. The invention comprises, in particular, singulation devices operating on the positive pressure principle. The invention further relates to a method for the dispensing of grains in a singulated manner and to an agricultural row unit having such a singulation device and/or for performing such a method.

BACKGROUND

Known from the prior art is WO 2010 059 101 A1, for example, which discloses a singulation device operating on the basis of a pressure difference and/or on the basis of a positive pressure, in which singulated grains are transported through a grain line to a seed furrow in an accelerated manner by means of compressed air. Wherein both the generation of the pressure difference for singulating the grains and the transport of the grains through the grain line in an accelerated manner by means of compressed air take place by means of a single compressed air supply and/or take place by means of the positive pressure which prevails and/or which is applied in a singulation chamber. While a transport of the grains toward the soil in an accelerated manner by means of compressed air is advantageous for some grain types it is unsuitable for other grain types. Moreover, the catching elements which are arranged opposite the outlets of the grain lines and which are required when transporting the grains in an accelerated manner by means of compressed air tend to become contaminated with earth in the case of damp, sticky soil, which may lead to incorrect grain dispensing. Furthermore, by using only one compressed air supply, an adaptation of the singulation and/or the transport of the grains through the grain line to different grain types is only possible to a limited extent. Additionally, high positive pressure levels are occasionally required in such a system.

Also known from the prior art is EP 3 050 419 B1 which discloses a singulation device operating on the basis of positive pressure, in which singulated grains are transported through a grain line in an accelerated manner by means of compressed air. Wherein both generating the pressure difference for singulating the grains and accelerating the grains through the grain line by means of compressed air may be implemented by means of a single compressed air supply, but an additional compressed air supply may also be provided in a dispensing region. In such a system, while a specific adaptation to different materials to be distributed may be possible, it is a drawback that the different compressed air supplies may be negatively influenced by the respective flows of air and/or the flow rates thereof and the pressure levels thereof, since an adapted dimensioning is not provided therefor. Thus due to the non-adapted dimensioning, it may arise that a transfer of grains from a singulation element into the grain line does not take place in a frictionless manner, or is not even possible. Moreover, the additional compressed air supply does not serve for the pneumatic separation between the compressed air from the receiving region and the grain line, but merely serves for assisting the transport of the grains in the grain line in an accelerated manner by means of compressed air and, in particular, the system does not prevent air from flowing from a receiving region through a grain line.

SUMMARY

An object of the invention, therefore, is to provide, in particular, an improved and/or alternative singulation device, preferably a singulation device which can, for example, be used universally for different grain types and/or for different soil conditions.

These objects are achieved by a singulation device having the features of the independent claim 1, and by a method for singulating grains having the features of method claim 27 and by an agricultural row unit having the features of claim 29. Advantageous developments are specified in the dependent claims and the description.

The invention relates to a singulation device (expediently a metering device), preferably for expedient mounting on an agricultural row unit and/or for singulating grains (for example seed, fertilizer or other material to be distributed, etc.) on the basis of a pressure difference and, in particular, on the basis of positive pressure. Wherein the row unit, preferably at least two such row units however, is/are able to be mounted on an agricultural machine.

The invention may be expediently used in singulation devices which generally operate according to the principle of pressure difference (differential pressure principle) and, in particular, the invention comprises singulation devices which operate with positive compressed air and thus in particular with positive pressure, i.e. with a positive pressure which is greater than atmospheric pressure.

The singulation device preferably comprises a chamber, for example for receiving the grains respectively to be dispensed and/or distributed, as well as a rotatable singulation element, wherein the chamber is delimited in at least one direction by a wall formed by the singulation element and wherein grains may be transported from the chamber to a dispensing region by means of the singulation element and/or wherein grains may be transported from the chamber to a grain line assigned to the dispensing region by means of the singulation element.

Moreover, the singulation device comprises a first compressed air supply which opens into the chamber (for example is operatively connected thereto) and by means of which the chamber can be supplied with compressed air in order to generate at least one pressure difference, wherein the singulation element has a plurality of recesses for the grains and the grains can be held in the recesses on the basis of a pressure difference using the compressed air provided by the first compressed air supply.

Moreover, the singulation device comprises a dispensing region for dispensing grains in a singulated manner, in particular from the singulation element into a grain line, in order to distribute grains in a singulated manner on or in soil (for example a seed furrow).

In order to provide an improved and/or alternative singulation device, preferably a singulation device which can be used universally, for example for different grain types and/or for different soil conditions, the invention provides a second compressed air supply, which second compressed air supply serves for preventing a flow of air out of the chamber into the grain line and for transporting the grains through the grain line in an accelerated manner by means of compressed air.

The second compressed air supply, for example, may open into the dispensing region and/or into the grain line (for example, may be operatively connected thereto). Additionally, the second compressed air supply may be defined and dimensioned such that a flow of air out of the chamber in the grain line and/or through the grain line is prevented.

The dimensioning may be defined, for example, geometrically, i.e. for example by corresponding cross sections of the second compressed air supply.

The chamber may be formed (for example defined) in the present case expediently, in particular, by the region of the singulation device in which grains are received and held by a singulation element on the basis of a pressure difference. Wherein the generation of the pressure difference may be expediently implemented by means of a first compressed air supply.

In the present case the dispensing region may be expediently defined, in particular, by the region of the singulation device in which grains are no longer held on the singulation element on the basis of a pressure difference. In particular, the dispensing region may be defined by the region of the singulation device in which the grains, after they have been held on the singulation element on the basis of a pressure difference, are no longer held on the singulation element due to an interruption of the pressure difference on the recesses of the singulation element. The dispensing region may be formed by the region in which the grains are no longer held on the singulation element, by interrupting the pressure difference on the recesses of the singulation element, and are transported through the grain line in an accelerated manner by means of compressed air, by means of a flow of air provided by means of a second compressed air supply.

The improved and/or alternative singulation device may be designed additionally and/or in particular such that the compressed air provided by means of the second compressed air supply is defined and dimensioned such that a volumetric flow (in particular a volumetric flow of air) is not generated from the chamber through the grain line, i.e. the transport of the grains in and/or through the grain line in an accelerated manner by means of compressed air is possible irrespective of the pressure and/or pressure level which is applied in the chamber and/or which generates the pressure difference.

In particular, the improved and/or alternative singulation device may be designed such that the compressed air provided by means of the second compressed air supply is defined and dimensioned such that a volumetric flow (in particular a volumetric flow of air) is not generated from the chamber through the grain line, i.e. for example, in particular, that the transport of the grains in and/or through the grain line in an accelerated manner by means of compressed air is possible at least substantially irrespective of the pressure and/or pressure level which is applied in the chamber and/or which generates the pressure difference.

The prevention of a flow of air from the chamber in the grain line and for the transport of the grains through the grain line in an accelerated manner by means of compressed air in the present case may preferably correspond to a substantial prevention of a flow of air from the chamber so that the acceleration of the grains, for the transport of the grains through the grain line in an accelerated manner by means of compressed air, is largely implemented by means of the flow of air generated by means of the second compressed air supply. Expediently it may be provided that the flow of air generated by means of the first compressed air supply is negligible for the transport of the grains through the grain line in an accelerated manner by means of compressed air.

The singulation device, in particular, is mounted on a row unit which preferably may be mounted on an agricultural machine, wherein to this end the row unit comprises a frame structure and wherein the singulation device may be spatially assigned to the frame structure of the row unit, in particular the singulation device is fixedly connected to a frame structure bearing the components of the row unit.

The row unit serves, among other things, for generating a seed furrow into which seed furrow the respective grains may be deposited. For generating the seed furrow, the row unit is assigned corresponding seed furrow generating implements, for example in the form of two cutting disks or tine implements, or the like, arranged at an angle to one another. The row unit may also be assigned seed furrow closing implements, such as pressure rollers or closing rollers, or the like. Moreover, various other implements may additionally be provided and connected and/or operatively connected in a pivotable and/or rotatable and/or fixed manner to the frame structure.

It is possible that the singulation device has a chamber (for example a seed storage region, receiving region, or the like) for receiving and, in particular, for storing the grains and at least one (for example substantially disk-shaped, plate-shaped or drum-shaped) rotatable singulation element (in particular metering element) defining the chamber at least in a direction through a wall formed thereby, wherein the singulation element has a plurality of recesses (for example holes, slots, pockets, or the like) for the grains and the grains may be held in the recesses on the basis of a pressure difference. The recesses may preferably be substantially uniformly spaced apart from one another, for example along at least one substantially circular path.

In order to convey the grains from the chamber into the dispensing region, the singulation element, in particular, is rotatably driven by means of a motorized drive (for example a pneumatically and/or hydraulically and/or electrically operated motor) and/or rotatably mounted in a housing of the singulation device. Wherein it may additionally be provided that the rotational speed is adjustable in a variable manner. In particular, the rotational speed may be adjusted, for example manually or in an automated manner, as a function of a travel speed of the agricultural machine.

The grains to be distributed may be supplied to the singulation device and/or the chamber by means of a pneumatic conveying system (for example a seed-on-demand system or nursing system, or the like) and/or on the row unit a storage container for receiving and forwarding the grains to be distributed may be attached to the chamber. Similarly, the storage container may be supplied in turn with grains by means of a pneumatic conveying system. Wherein the chamber in each case is designed such that a plurality of grains may be received and/or stored therein.

According to the invention it may additionally be provided that the pressure level generated by means of the first compressed air supply in the chamber is defined and dimensioned such that this pressure level has no effect on the pneumatic conveying system, in particular it may be provided that the pressure level in the pneumatic conveying system is greater than or equal to the pressure level in the receiving region of the chamber. It is additionally possible that the compressed air from the pneumatic conveying system and the compressed air from the receiving region of the chamber are connected by means of corresponding devices (for example perforated metal plates). The pressure levels may also be regulatable and/or are regulated by means of a control and/or regulating device.

For the singulation of grains on the basis of a pressure difference, the singulation device provides a first compressed air supply (for example one or more compressed air connections) which opens into the chamber and via which the chamber may be expediently supplied with positive compressed air (expediently positive pressure) for generating at least one pressure difference on the recesses of the singulation element. Wherein the positive compressed air in this case is applied to the side of the singulation element on which the grains are located and a lower pressure level, in particular atmospheric pressure, is applied to the singulation element on the opposing side of the grains.

According to the invention, it is provided that the generation of the pressure difference on the recesses of the singulation element is carried out exclusively by means of the first compressed air supply, but not the transport of the grains in and/or through a grain line in an accelerated manner by means of compressed air, for transporting the grains onto or into the soil (for example into a seed furrow).

In order to permit a uniform dispensing of grains in a singulated manner from the singulation element into a grain line (for example a seed tube) and in order to permit a transport of singulated grains through a grain line in an accelerated manner by means of compressed air, the singulation device additionally comprises a dispensing region.

For the transport of the grains in the grain line in an accelerated manner by means of compressed air the second compressed air supply (for example one or more compressed air connections) may open into the dispensing region and/or at least in some sections into the grain line, preferably such that the grains are shot through the grain line and/or are shot out of the grain line, for example substantially tangentially to a catching element, such as for example a catching roller or a seed firmer attached to the row unit.

It should be mentioned that in the present document the transport of the grains in an accelerated manner by means of compressed air refers to speeds which are greater than gravity, so that grains for example are "shot" at up to 25 km/h and more through the grain line.

The singulation device according to the invention is characterized, in particular, in that the compressed air provided by means of the second compressed air supply, in particular opening into the dispensing region, is defined and dimensioned such that a flow of air from the chamber through the grain line is prevented and/or by which compressed air provided by means of the second compressed air supply is no longer possible, in particular is no longer possible in that it forms a pneumatic flow barrier.

A singulation device, which may be universally used for different grain types, may therefore, be achieved in that the chamber and the grain line are at least substantially pneumatically separated, i.e. the compressed air from the chamber has no influence on the transport of the grains in the grain line in an accelerated manner by means of compressed air and vice versa, whereby adaptations of the transport of the grains in an accelerated manner by means of compressed air are possible without negatively influencing the singulation on the basis of a pressure difference.

In a preferred embodiment of the invention, it is provided that the compressed air provided by means of the second compressed air supply forms a flow barrier and/or an air barrier for the compressed air provided in the chamber by the first compressed air supply in the direction of the grain line, so that no compressed air is able to escape from the chamber via the grain line and/or so that in particular a flow of air in the grain line is not generated by the pressure level applied in the chamber, in particular a transport of grains in an accelerated manner by means of compressed air is not generated.

In a variant, it may be provided that the first compressed air supply and the second compressed air supply are arranged relative to one another such that the Coanda effect is formed therebetween, i.e. the flow of air generated by means of the first compressed air supply acts on the flow of air generated by means of the second compressed air supply such that this flow of air is deflected in the direction of the grain line but without the flow of air generated by means of the first compressed air supply also being able to pass into the grain line.

It may be expediently provided, in particular, that the first compressed air supply and the second compressed air supply are arranged and/or dimensioned relative to one another such that in the inlet region the flow of air provided by the second compressed air supply is conducted in the direction of the grain line due to a resulting Coanda effect.

In particular, additionally or alternatively it may be provided that the first compressed air supply and the second compressed air supply are arranged and/or dimensioned relative to one another such that in the inlet region the flow of air provided by the first compressed air supply is not conducted in the direction of the grain line due to a resulting Coanda effect.

It may be expediently provided, in particular, that the Coanda effect is generated such that the flows of air and/or the pressure levels provided by means of the first compressed air supply and by means of the second compressed air supply are arranged and/or dimensioned relative to one another such that the flow of air generated by means of the second compressed air supply slides along the flow of air generated by means of the first compressed air supply and/or comes into contact therewith, expediently, in particular, from a line forming the second compressed air supply in the direction of the grain line.

It is possible that the flow barrier is formed by a resulting Coanda effect.

For example, this means that the flow barrier may preferably be generated at the position in which a flow of air generated by means of the second compressed air supply slides along the flow of air generated by means of the first compressed air supply and/or comes into contact therewith.

It is additionally possible that, in the region where the Coanda effect is arising, the pressure levels and/or flows of air provided by means of the first compressed air supply and by means of the second compressed air supply are mixed together, but in turn the flow of air and/or the pressure level provided by means of the first compressed air supply does not generate a transport of the grains through the grain line in an accelerated manner by means of compressed air and the flow of air and/or the pressure level provided by means of the second compressed air supply does not generate a pressure difference on the singulation element.

The singulation device according to the invention is, therefore, characterized relative to the singulation devices known from the prior art in that this singulation device comprises all of the advantages of singulation on the basis of a pressure difference and a transport of grains in an accelerated manner by means of compressed air, wherein however both the singulation on the basis of a pressure difference and the transport in an accelerated manner by means of compressed air, due to the respectively separate compressed air supply and the definition and dimensioning thereof, are able to be changed in a variable manner at least substantially independently of one another.

In order to provide a singulation device in which the compressed air, i.e. the pressure level in the chamber and in the dispensing region, may be respectively changed at least substantially independently of one another, in a preferred embodiment it is provided that the total pressure present in the dispensing region is greater than or equal to the total pressure present in the chamber.

In particular, it may be provided that the total pressure present in the dispensing region is greater at least by the factor of 1.5 or 2 or 2.5 or 3 than a total pressure present in the chamber.

It is possible that the respective pressure levels provided by means of the first compressed air supply and by means of the second compressed air supply, expediently the static pressure levels, are at least approximately equal at least in the dispensing region and/or adjoining the dispensing region. It is additionally possible that the pressure level provided by means of the second compressed air supply, expediently the dynamic pressure level thereof, at least in the dispensing region and/or adjacent to the dispensing region, is greater than the pressure level provided by means of the first compressed air supply, expediently the dynamic pressure level thereof.

A preferred variant of the singulation device may be provided in that the total pressure in the dispensing region is defined such that the flow rate of a flow of air generated by the compressed air from the chamber in the direction of the dispensing region is reduced at least approximately to a standstill.

The respective flow barrier, in particular also the position thereof, may also be defined as a function of the ratio between the total pressure in the dispensing region and the total pressure in the chamber, i.e. the greater the ratio and/or the difference between the total pressure in the dispensing region and the total pressure in the chamber, the further the flow barrier is displaced, for example, in the direction of the chamber and/or the further the flow barrier is displaced away from a grain line. In particular, the dispensing region is larger or smaller as a function of the total pressure in the dispensing region relative to the total pressure in the chamber, i.e. the greater the total pressure in the dispensing region, the larger the dispensing region.

In particular, the invention may provide that the flow barrier is present at the position at which the total pressure present therein is equal to the total pressure in the receiving region.

The invention may provide, in particular, that the flow barrier present is located upstream of the grain line, in particular upstream of an inlet region of a grain line.

It is possible that a pressure level P1 (for example a positive pressure level which is greater than atmospheric pressure) is generated in the chamber by means of the first compressed air supply. Additionally it may be provided that a pressure level P2 (for example a positive pressure level which is greater than atmospheric pressure) is generated in the dispensing region by means of the second compressed air supply. In order to provide a flow barrier between the chamber and the grain line, according to the invention it may be provided that the pressure level P1 is less than or equal to the pressure level P2, in particular however permanently less, wherein in turn the position of the flow barrier is displaced in the direction of the chamber and/or away from the grain line as a function of the difference in the pressure level P1 relative to the pressure level P2. In particular, the dispensing region is larger or smaller, as a function of the pressure level P1 in the chamber relative to the pressure level P2 in the dispensing region, i.e. the greater the pressure level P2 in the dispensing region, the larger the dispensing region.

The flow barrier is formed, in particular, pneumatically by the different pressure levels and/or total pressures, without valves or the like being required therefor.

The flow barrier, in particular, is generated pneumatically as a function of the pressure level P1 relative to the pressure level P2, and/or the flow barrier is generated as a function of the total pressure T1 and the total pressure T2.

It is possible that the cross sections (in particular the flow cross sections) of the first compressed air supply and the second compressed air supply are dimensioned (for example have corresponding cross sections) such that the flow rates of the flows of air in the dispensing region are greater than in the chamber but the flow rates in the dispensing region are not so great that a transfer and/or a transport of grains from the chamber into the dispensing region is no longer possible and/or is prone to error.

The pressure level P1 may be 35 mbar, for example, and the pressure level P2 may be 36 mbar, for example, wherein in turn other pressure levels might also be conceivable here, wherein the pressure levels in particular may vary as a function of the respective type of grain (in particular grain size).

The grain line comprises an inlet region which adjoins the dispensing region and/or is formed thereby and an outlet region which during operation of the singulation device and/or the row unit is arranged and/or runs in the vicinity of and/or in a seed furrow and/or in the soil, wherein additionally a catching element may be arranged downstream of the outlet region.

The path of the grain line between the inlet region and the outlet region may be at least partially arcuate and/or linear. The catching element (for example catching roller, seed firmer, or the like) may in particular be arranged relative to the outlet region such that a flow direction and/or direction of flow of singulated grains from the grain line runs tangentially to the catching element or this forms an angle bisector between a tangent to the catching element and to a soil surface. The grains, which are accelerated by means of compressed air, may be correspondingly decelerated by means of the catching element in order to prevent rolling in the seed furrow.

Additionally, the grain line may be located on one plane between the inlet region and the outlet region relative to a forward direction of the row unit but may also run in turn in an at least partially arcuate manner and/or transversely thereto.

The grain line may additionally be produced from a flexible material or may be produced from a non-flexible material.

The grain line may have an at least partially circular cross section and/or may be configured to be at least partially cylindrical. In particular, the grain line may be cylindrical in the outlet region.

The grain line may have a uniform cross section or an at least partially changing cross section between the inlet region and the outlet region. In particular, the inlet region may have a larger cross section than the outlet region.

It may be provided that, in particular, different grain lines, in particular having different cross sections, may be mounted on the singulation device and/or on the dispensing region. Thus different grain lines may be mounted thereon as a function of the respective grain size. Wherein, to this end, corresponding devices may be attached to a housing of the singulation device, to which devices the different grain lines may be fitted in turn. Additionally, the total pressure in the chamber and/or in the dispensing region may be varied and/or correspondingly adapted as a function of the respective grain line. Expediently this may be carried out manually or in an automated manner.

Additionally during operation of the singulation device the atmospheric pressure $P_{amb}$ (ambient pressure) is applied to the outlet region of the grain line, i.e. the positive pressure here is 0 bar, wherein the atmospheric pressure, in particular, is less than the pressure level P1 in the chamber and the pressure level P2 in the dispensing region.

Moreover, a lower pressure level is applied to the singulation element on an opposing side of the grains than on the side of the grains, in particular the atmospheric pressure $P_{amb}$ (ambient pressure), whereby a corresponding pressure difference is generated on the recesses of the singulation element, by which pressure difference grains are held on the recesses during operation of the singulation device. In particular, by the pressure difference on the recesses a flow of air is generated transversely to the singulation element and/or perpendicular to the recesses of the singulation element, by which flow of air grains may be held on the recesses and/or "suctioned" thereon.

A design of the singulation device may be provided and/or a preferred embodiment of the singulation device may be provided, such that during operation the following applies:

$$P2 \geq P1 \geq P_{amb}$$

in particular, however, it may be provided that during operation it is as follows:

$$P2 \geq P1 > P_{amb}$$

By such a design and/or embodiment of the singulation device, therefore, it may be achieved that a sufficient pressure difference for receiving grains is generated by the singulation element and that a transport of grains through the grain line in an accelerated manner by means of compressed air takes place irrespective of the pressure difference for receiving grains.

For interrupting the pressure difference at the recesses of the singulation element, the singulation device and/or the singulation element may be assigned a pressure difference interrupting element (for example sealing element, roller or the like) on the opposing side of the grains in the dispensing region. Wherein it is additionally possible that the pressure difference interrupting element is arranged at least partially opposite the flow barrier, which is in particular present between the dispensing region and the chamber and/or upstream of the grain line, and/or that the pressure difference interrupting element is arranged in the rotational direction of the singulation element downstream of this flow barrier.

A simple design of the singulation device is able to be achieved in which the dispensing region is formed by a grain line opening into the chamber and/or by a grain line opening into a housing of the singulation device. Wherein according to the invention it may be provided that while the grain line is spatially assigned to the chamber, due to the flow barrier generated by means of the first compressed air supply and the second compressed air supply an at least substantially pneumatic separation takes place between the compressed air in the chamber and the grain line.

According to a further feature of the invention, the dispensing region is defined, in particular, such that a pressure difference is not able to be generated therein on the recesses, whereby in the dispensing region grains are no longer held on the singulation element. In particular, the dispensing region is defined such that in this case the flow rate of the second compressed air supply is sufficiently great that the grains are released from the singulation element and accelerated in the direction of and/or through the grain line.

It is possible that the dispensing region is not formed, in particular, by a chamber for receiving grains but by a grain line for receiving the grains and for the transport of the grains in the direction of a seed furrow.

It is possible that the second compressed air supply is formed by an air line which at least partially surrounds the grain line, wherein to this end the air line has a greater internal diameter and/or internal cross section than an external diameter and/or external cross section of the grain line, and in turn the second compressed air supply may be implemented through the resulting gap.

Moreover, in the air line a greater static pressure may be applied and lower flow rates of a flow of air may be present therein than in a dispensing region and/or in a grain line. In particular, the pressure level in the air line is greater than the pressure level and/or the atmospheric pressure at the outlet region of the grain line. By the resulting pressure difference between the air line and the grain line a flow of air in the grain line is generated, by which flow of air in the grain line a transport of the grains is generated through the grain line in an accelerated manner by means of compressed air. In particular, therefore, the flow rate of the flow of air generated in the grain line is greater than a flow rate of a flow of air from the chamber in the direction of the dispensing region, whereby a flow of air from the chamber is not generated in the grain line.

For supplying the air line with the corresponding compressed air, additionally this air line may be connected to a compressed air source (for example a fan, in particular a positive pressure fan). Wherein in turn the compressed air source may also be connected to the air line by means of an element and/or connection surrounding the grain line.

The air line may have an at least partially circular and/or cylindrical cross section. Additionally the air line may be attached concentrically to the grain line.

The air line may be produced from a flexible material and may be correspondingly deformable. The air line, however, may also be produced from a non-deformable material.

It is possible that grain lines with different cross sections may be inserted in the air line, wherein this is carried out in each case such that a gap is produced between the internal diameter of the air line and the external diameter of the grain line, through which gap in turn the second compressed air supply is implemented. Wherein, as a function of the size of the gap, the flow rates of a flow of air therein and/or the static pressure level is altered.

It may be provided that the cross section of the internal diameter of the air line corresponds to at least 1.2 times or at least 1.5 times or at least 2 times or at least 3 times the cross section of the external diameter of the grain line.

It may be provided that different air lines and/or grain lines may be assembled on the singulation device and/or in the housing of the singulation device. Wherein to this end, in particular, the air line and the grain line may form a unit and, in particular, may be fixedly connected together. A segment consisting of an air line and a grain line may also be attached to the singulation device (in particular may be inserted into the housing), wherein a quick change system may be provided for the assembly, for example a clip system, a latching element system, a split pin system or a plug-in system. Wherein with such a design the segment may form only a partial portion of the grain line and/or the air line onto which in turn a further portion of the grain line and/or a pressure supply unit may be assembled or connected. In particular, the segment may be attached by means of an adapter element to the singulation device.

The air line and the grain line may be flush relative to one another in the dispensing region or the grain line may extend further into the dispensing region than the air line, in particular the grain line may protrude beyond the air line in the direction of the dispensing region.

It is possible that the air line at least partially extends further into the dispensing region than the grain line, whereby an even more targeted flow of air in the grain line may be achieved.

It is possible that the air line and the grain line may be adjusted to one another such that, for example, it is possible to adjust how far the grain line and/or the air line protrude into the dispensing region and/or how far they extend toward the singulation element.

In particular, the grain line may have a chamfer and/or an undercut in the direction of the singulation element. Wherein the air line may also have such a chamfer and/or undercut.

It is possible that the cross sections of the air line and/or the grain line may be adjusted in a variable manner, expediently manually or in an automated manner. In particular, the cross sections may be adjustable in a stepless manner.

It may be provided that the air line additionally has lateral openings, compressed air also being able to escape thereby laterally, i.e. transversely through the air line, whereby an even further improved configuration of a dispensing region is possible.

The arrangement between the air line and the grain line, for example, may be such that an injector and/or ejector is formed therein, i.e. thereby, in the dispensing region, by which ejector the grains are firstly transported through the grain line in an accelerated manner by means of compressed air and by which ejector additionally a dispensing of the grains from the singulation element into the grain line is further improved, in particular by a suctioning action produced by means of the ejector.

The flow direction of the flow of air through the air line, in particular, may be counter to the rotational direction of the singulation element, in particular in the vertical direction from bottom to top. Expediently it may be provided that a flow of air generated by the second compressed air supply is configured in order to generate a counter flow and/or a flow barrier relative to a flow of air from the chamber in the direction of the grain line.

Additionally the flow direction of the flow of air in the grain line may be oriented in the rotational direction of the singulation element, in particular in the vertical direction from top to bottom. The flow direction of the flow of air through the air line may also be oriented from bottom to top parallel to the path of the air line, and the flow direction of the flow of air in the grain line may be oriented from top to bottom parallel to the path of the grain line.

It is possible that the second compressed air supply opens transversely into the dispensing region and/or the second compressed air supply opens transversely into the housing of the singulation device and thus forms the dispensing region. The compressed air which is provided by means of the second compressed air supply, in particular, is produced transversely from bottom to top, in particular the flow of air introduced into the dispensing region is oriented from bottom to top (for example from the direction of the grain line in the direction of the receiving region and/or counter to a rotational direction of the singulation element). The second compressed air supply is connected, in particular, to a compressed air source.

It is possible that an air line forming the second compressed air supply is arranged relative to the singulation element, in particular is arranged at an angle from the singulation element. According to the invention, in this case it may be provided that the angle ranges between 0° and 90° and/or ranges between 45° and 80°. Wherein 90° in this case encompasses perpendicular, and 0° encompasses substantially parallel, to the singulation element. Additionally the angles in each case may be provided directly on and/or adjacent to the singulation element and/or directly and/or adjacent in the region of the chamber and/or in the dispensing region.

It is possible that an air line forming the second compressed air supply may be arranged relative to the recesses of the singulation element. In particular, an air line may be arranged relative to a central line of the recesses of the singulation element, in particular at an angle to a central line of the recesses. Wherein in this case additionally it may be provided that the angle ranges between 0° and 90°.

It may be provided that the air line which forms the second compressed air supply is arranged at an angle to the grain line, wherein the angle in particular ranges between 90° and 170°. Wherein the angle in each case may be provided directly on and/or adjacent to the singulation element and/or to a housing of the singulation device.

It is possible that the air line forming the second compressed air supply and the grain line are formed at least partially by a line which is formed, for example, by a tube portion which is continuous and/or substantially curved in an arcuate manner (for example substantially continuously curved).

The line, in particular the tube portion, may preferably be curved in the region of the inlet region at least partially, for example continuously and/or in a substantially arcuate manner.

It is possible that the line, in particular the tube portion, is expediently configured in one piece or multiple pieces.

Preferably, the line, in particular the tube portion, may comprise the inlet region.

It is possible that the line has, for example, a portion forming the inlet region (for example a recess or a different suitable opening) and/or preferably the cutout is at least partially formed in the outer surface (for example of a side wall) of the tube portion and/or is arranged in the region of the singulation element (for example substantially directly opposite the singulation element).

In this case the tube portion may expediently be configured to be at least partially, for example substantially, L-shaped or U-shaped or V-shaped or at least partially substantially curved in an arcuate manner.

The inlet region of the grain line may additionally be formed by an opening in the side wall of the line.

The line may additionally be arranged relative to the singulation element such that this line undercuts the singulation element and/or in that the singulation element at least partially forms a side wall of the line.

It may additionally be provided that the tube portion has a substantially uniform cross section, in particular a passage cross section.

It is possible that the tube portion has changing cross sections, in particular passage cross sections, for example a substantially continuously changing passage cross section.

It is possible that the line, in particular the tube portion, may preferably extend substantially directly on and/or adjacent to the singulation element and/or a housing of the singulation device, at least partially.

It is possible that the portion of the line which forms the second compressed air supply and the portion of the line which forms the grain line are arranged at an angle (for example between 90° and 170°) to one another and/or that these portions have an at least partially substantially arcuate transition region, wherein the transition region may be located, in particular, in the region of the inlet region, expediently at least opposite the inlet region. In particular, it may be expediently provided that the Coanda effect is formed opposite the at least partially arcuate transition region.

The line and the tube portion may preferably be the same part so that preferably the disclosure relative to the line may also expediently apply to the tube portion or vice versa.

In the second compressed air supply, additionally a greater static pressure may be applied and lower flow rates of a flow of air are present therein than in a dispensing region and/or in a grain line. In particular, the pressure level in the compressed air supply is greater than the pressure level and/or the atmospheric pressure at the outlet region of the grain line. By the resulting pressure difference between the compressed air supply and the grain line, a flow of air is generated in the grain line, by which flow of air in the grain line the grains are transported in an accelerated manner by means of compressed air. In particular, the flow rate of the flow of air generated in the grain line is greater than a flowrate of a flow of air out of the chamber in the direction of the dispensing region, whereby a flow of air from the chamber is not generated in the grain line.

In particular, the compressed air respectively provided by means of the second compressed air supply is defined and dimensioned such that flows of air with a lower flow rate and a high static pressure level prevail and/or are present in these flows of air, wherein this may be implemented in particular by large cross sections (flow cross sections) of the second compressed air supply, expediently by large cross sections of the second compressed air supply in the region in which this second compressed air supply opens into the dispensing region and/or into the grain line.

In particular, the second compressed air supply may be arranged such that a flow direction, generated by said second compressed air supply, of the flow of air supplied thereby is oriented counter to a flow of air from the receiving region in the direction of the grain line, whereby an even further improved flow barrier is achieved relative to the prior art.

In particular, the second compressed air supply may be arranged such that a flow of air generated thereby generates a counterflow relative to a flow of air from the chamber in the direction of the grain line.

In order to achieve an even further improved prevention of a flow of air from the chamber through the grain line, additionally it may be provided that the chamber and the dispensing region are separated by a partition from one another, in particular however at least partially separated by a partition. The partition additionally may have at least partially the same path as the circular path of the recesses on the singulation element. Moreover, the partition may have an at least partially uniform path and/or parallel path to the grain line.

The partition may additionally have an opening for passing through grains from the chamber into the dispensing region.

The partition may be designed, in particular, such that no grains may pass from the chamber into the grain line without the action of the singulation element. Additionally it may be provided that the partition is designed such that no elements (for example grains, particles of dirt, or the like) which have reached the dispensing region are passed back into the chamber.

The first compressed air supply and/or the second compressed air supply in each case may have one or more compressed air connections in the chamber and/or in the dispensing region and/or in the grain line. Wherein the compressed air connections of the first compressed air supply and/or the second compressed air supply in each case may be subjected to an equal or different pressure level and may have equal or different cross sections.

In a further embodiment of the singulation device it may be provided that the pressure level provided by means of the first compressed air supply and/or by means of the second compressed air supply and/or the flow cross sections thereof (for example the line cross sections thereof) are adjustable and/or regulatable in a variable manner, in particular are adjustable and/or regulatable in a variable manner by means of a control and/or regulating device. For example, a valve, etc. which is expediently manually adjustable and/or electrically and/or pneumatically and/or hydraulically actuatable, may be provided for the adjustment and/or regulation. Automated control and/or regulating devices might also be conceivable.

It is possible that a manual adjusting device or an expediently electrical and/or pneumatic and/or hydraulic control device is provided, via which the compressed air from the first compressed air supply and/or from the second compressed air supply is able to be changed in terms of its intensity and/or is activatable and/or deactivatable. Wherein according to the invention the intensities in each case are able to be changed and/or are activatable and deactivatable, such that in the dispensing region a flow barrier is generated so that a change to the compressed air provided by means of the first compressed air supply has at least substantially no effect on the compressed air provided by means of the second compressed air supply and vice versa. In particular, according to the invention changes to the compressed air provided by means of the first compressed air supply have no effect on the transport of the grains in the grain line in an accelerated manner by means of compressed air.

It is possible that a pressure restrictor portion (for example a pressure restrictor element) for reducing pressure is preferably arranged in the rotational direction of the singulation element upstream of the dispensing region and/or upstream of the grain line and/or the pressure restrictor portion, for example comprises a brush construction, a foam construction and/or a spring-plate construction. By such a pressure restrictor portion, in particular, a pneumatic separation may be even further improved and a flow barrier generated in a more targeted manner.

In particular, it may be provided that the singulation device has a partition and the pressure restrictor portion is attached between the partition and the housing of the singulation device.

In order to provide a singulation device which may be used in an even more variable manner, in a development it may be additionally provided that the second compressed air supply may be mounted at different positions in the dispensing region. Wherein a quick change system may be provided for the assembly of the second compressed air supply, for example a clip system, a latching element system, a split pin system or a plug-in system.

In a variant it may be additionally provided that the singulation device comprises a separating region, which separating region may be, in particular, assigned to the chamber, in particular spatially assigned. The separating region comprises at least one separating device (for example one or more separating elements) of the singulation element, for removing excess grains from the recesses. Wherein the separating region, in particular, is arranged such that grains released from the singulation element may be passed back again into the chamber through the separating region and may not reach the dispensing region and/or the grain line, wherein this may be even further improved by a corresponding arrangement of a partition between the chamber and the dispensing region.

The separating device may, for example, have one or more scraper blades, for example at least one leading edge, at least one projection, at least one metal plate or at least one roller for the mechanical removal of excess grains, or may have one or more brushes for the mechanical removal of excess grains or may have one or more nozzles for the pneumatic removal of excess grains.

In the dispensing region, the grains may also be subjected to a directional change, for example from an initially circular movement along the circular path of the recesses of the singulation element into an at least partially linear direction of movement along the grain line. Wherein the grain line in this case may be arranged at an angle to a tangent to the circular path of the recesses of the singulation element which is greater than or equal to 0° and less than or equal to 30°. In particular, however, it is 0°.

The grain line may be at least partially attached at an angle to the wall formed by the singulation element. Wherein the angle is greater than or equal to 0° and less than or equal to 30°. In particular, however, it may be 0°.

The first compressed air supply and the second compressed air supply may be attached to a common compressed air source and/or attached to different compressed air sources. In the embodiment with different, and thus a plurality of, compressed air sources the respective compressed air supply may thus be supplied with compressed air via a separate dedicated compressed air source. Wherein the first compressed air supply and the second compressed air supply in each case are implemented such that a transport of the grains in the grain line in an accelerated manner by means of compressed air is not influenced by means of the first compressed air supply and that a generation of a pressure difference on the singulation element in the chamber is not influenced by means of the second compressed air supply.

In a development of the invention, it is also possible that the chamber and/or the dispensing region and/or the first compressed air supply and/or the second compressed air supply are assigned measuring means for detecting the pressure level and/or for detecting the flow rate of the flow of air and/or the total pressure. Wherein in turn it may be provided that the respective pressure levels and/or the flow rates and/or the total pressure in each case is varied as a function of the values detected by the measuring means.

It is possible that the calculation and/or the determination of the total pressure is carried out by means of a control program stored in a computer unit. Which computer unit in turn may be operatively connected to a control and/or regulating device.

It is possible that a control device controls the pressure levels provided by means of the first compressed air supply and/or by means of the second compressed air supply and/or flow rates of a flow of air as a function of a singulation quality and/or storage quality of the grains detected, for example during operation of the singulation device (for example spacing accuracy and/or coefficient of variation, etc.). Alternatively or additionally, the control device may control the pressure levels and/or flow rates, for example as a function of, in particular, soil characteristic values detected during operation of the singulation device (for example furrow path, soil topography, soil moisture, etc.). The detection may take place here, for example, by means of one or more sensors, cameras and/or lasers, etc.

In one embodiment of the invention, the control device may also expediently be a regulating device, for example, so that in an embodiment of the invention the "control system" mentioned herein may also expediently comprise a "closed loop control".

While the singulation device according to the invention has been described above, at this point it should be expressly emphasized that all features and variants which have been described in combination with the singulation device may relate equally to, or be partial features of, the following method according to the invention and the following row unit according to the invention. If, therefore, at a point in the description or even in the definition of the claims the singulation device according to the invention is mentioned, this equally applies to the method according to the invention and the row unit according to the invention. The same applies conversely, so that all of the features which are described in connection with the method according to the invention or in connection with the row unit according to the invention may be equally partial features of the singulation device.

In order to achieve the objects, the invention additionally proposes a method for singulating grains, in particular for singulating grains on the basis of a pressure difference. Wherein the method initially comprises the steps:

providing and preferably receiving grains, for example by means of a chamber, transporting the grains from the chamber to a dispensing region by means of a rotatable singulation element, wherein the chamber is defined in at least one direction by a wall formed by the singulation element, generating at least a pressure difference in the chamber by means of a first compressed air supply which opens into the chamber, wherein the singulation element has a plurality of recesses for the grains and the grains are able to be held in the recesses on the basis of a pressure difference, by the compressed air provided by the first compressed air supply, dispensing singulated grains into a grain line in order to distribute singulated grains on or in the soil.

In order to provide a method by which a singulation of grains, which is able to be used universally for different grain types and/or for different soil conditions, is implemented, the method additionally provides a prevention of a flow of air from the chamber into the grain line and a transport of the grains through the grain line in an accelerated manner by means of compressed air, by means of the compressed air provided by the second compressed air supply.

In a further variant of the method, it may be provided that the pressure level provided by means of the first compressed air supply and/or by means of the second compressed air supply and/or the flow cross sections thereof (for example the line cross sections thereof) are adjustable and/or regulatable in a variable manner, in particular are adjustable and/or regulatable in a variable manner by means of a control and/or regulating device. For the adjusting and/or regulating, for example, an expediently manually adjustable and/or electrically and/or pneumatically and/or hydraulically actuatable valve, etc. may be provided. Automated control and/or regulating devices might also be conceivable.

The invention additionally comprises an agricultural row unit with at least one singulation device as disclosed herein and/or for performing a method as disclosed herein. Wherein at least two such row units, in particular, may be mounted on a support structure of an agricultural machine. The row units in this case, for example, may be configured so as to be able to be mounted in a movable manner on the support structure, for example via a parallelogram arrangement.

The row unit may comprise, for example, at least one seed furrow-generating implement and preferably a seed furrow closing implement. Moreover, various other implements may additionally be provided and pivotably and/or rotatably and/or fixedly connected to the frame structure.

The row unit may also comprise, for example, a catching element (for example a catching roller or a seed firmer), wherein grains may be shot by means of the compressed air provided by the second compressed air supply, for example substantially tangentially counter to the catching element.

In order to provide a row unit which may be used for different soil conditions, it is possible that the catching element may be mounted on the row unit via a quick change system (for example a clip system, a latching element system, a split pin system or a plug-in system) and/or is designed in order to be pushed by means of pretensioning (for example by being spring-loaded) against the soil (for example a seed furrow), wherein the pretensioning may preferably be adjustable in terms of its intensity.

On the row unit, in particular, a singulation device as disclosed herein is mounted, wherein the row unit to this end may have a frame structure bearing the components of the row unit, in particular the singulation device is fixedly connected to a frame structure bearing the components of the row unit.

BRIEF DESCRIPTION OF THE DRAWINGS

The preferred embodiments and features of the invention described above are able to be combined together in any manner. Further details and advantages of the invention are described hereinafter with reference to the accompanying drawings. The size ratios of the individual elements to one another in the figures do not always correspond to the actual size ratios, since some shapes are simplified and other shapes are enlarged in comparison with other elements for improved clarity. In the drawings.

DETAILED DESCRIPTION OF THE INVENTION

Figure 1:
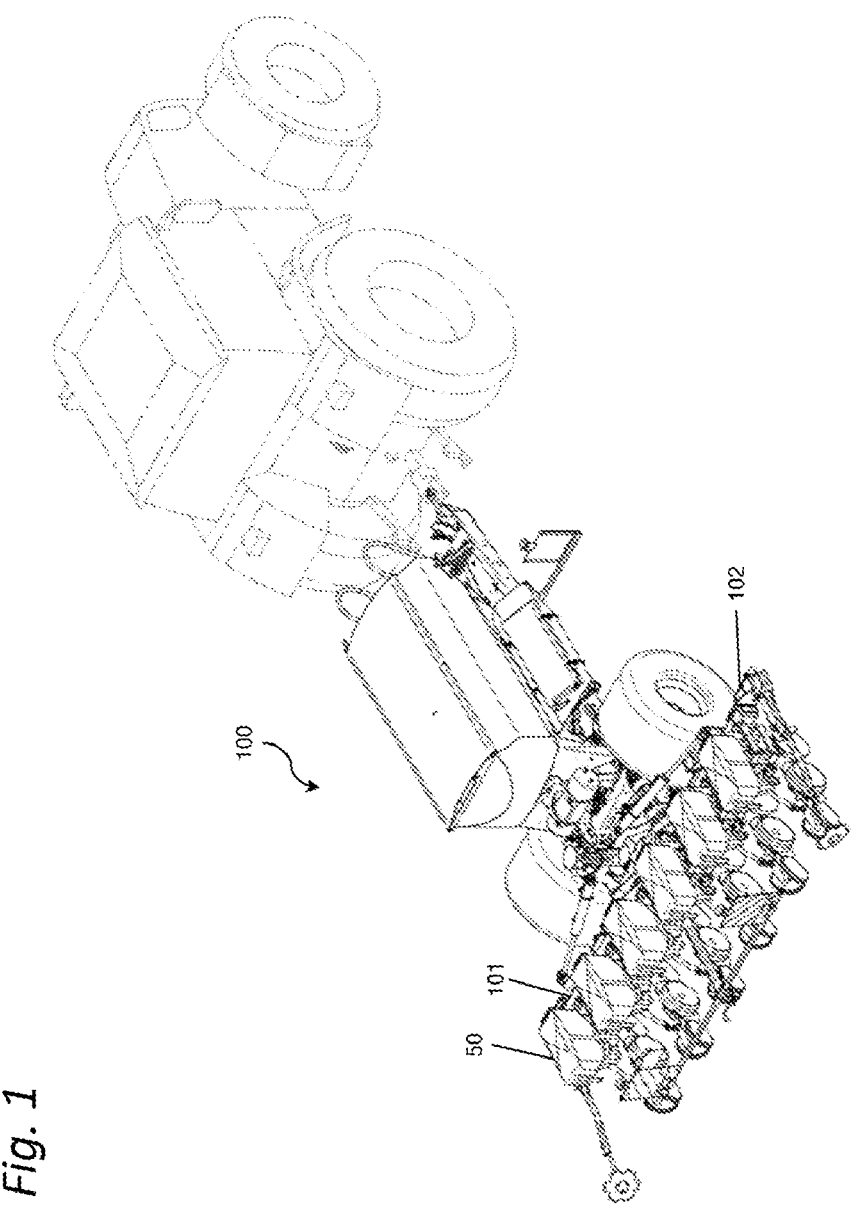
FIG. 1 shows a perspective view of an agricultural machine having a plurality of row units with a singulation device.

The embodiments shown in FIGS. 1 to 5 at least partially coincide so that similar or identical parts are provided with the same reference numerals and for the description thereof reference is also made to the description of other embodiments and/or figures, in order to avoid repetition. The embodiments shown merely represent examples as to how the singulation device according to the invention, the method according to the invention and the row unit according to the invention may be designed and embodied and do not constitute a final limitation.

An exemplary embodiment of an agricultural machine 100 with a plurality of row units 50 arranged at intervals from one another is shown in the perspective view of FIG. 1. In each case, singulation devices 10 according to the invention are attached to the row units 50. The agricultural machine 100 is moved by a traction vehicle along an agricultural area and serves for dispensing grains (for example seed, fertilizer, etc.) in a singulated and/or evenly distributed manner. The agricultural machine 100 comprises a support structure. A plurality of row units 50 with in each case a singulation device 10 is expediently pivotably and/or movably mounted on the support structure, for example via a parallelogram device. The support structure comprises, in particular, two pivotable supports 101 and 102 for reducing the width of the support structure.

Figure 2:
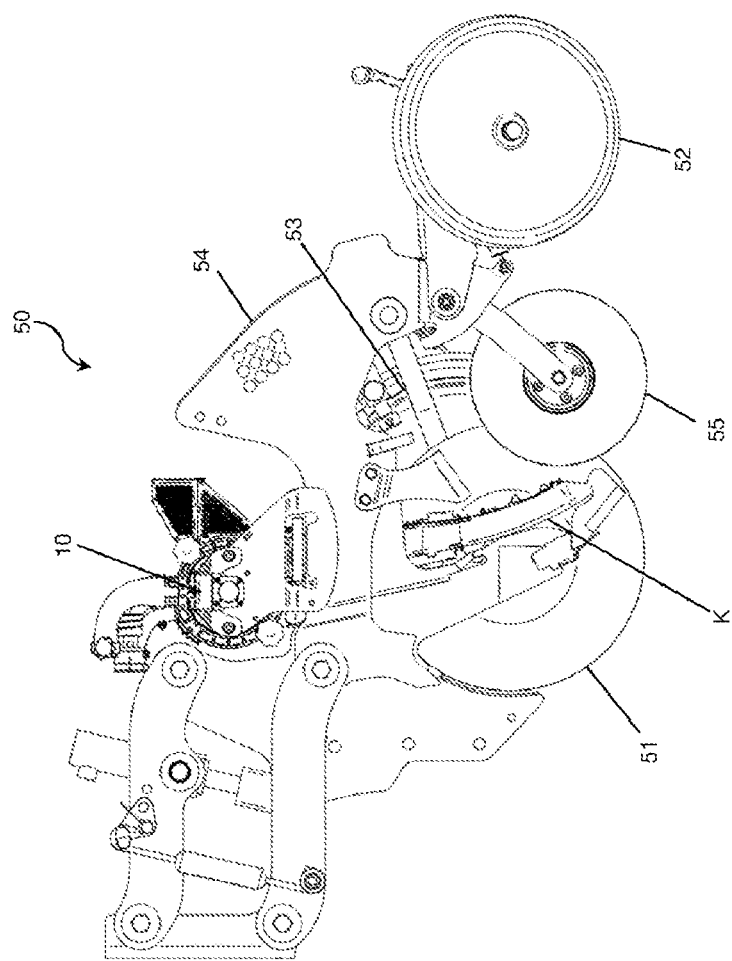
FIG. 2 shows a side view of a row unit with a singulation device and with a grain line and a catching element.

Further details of a variant of a row unit 50 are shown in the side view of FIG. 2. The row unit 50 comprises a seed furrow generating implement 51 (for example a cutting disk and/or two cutting disks arranged at an angle to one another) and a seed furrow closing implement 52 (for example a pressure roller and/or two pressure rollers or finger rollers or the like, arranged at an angle to one another). For varying the respective depth of the seed furrow produced, the row unit 50 additionally comprises a depth guide element 53 which is adjustable in terms of the height thereof.

For singulation and/or even distribution of the respective grains, a singulation device 10 is spacially associated with the row unit 50. In particular, the singulation device is fixedly connected to a frame structure 54 bearing the components of the row unit 50.

A grain line K adjoins the singulation device 10, grains from the singulation device 10 being able to be transported in particular in an accelerated manner by means of compressed air in the direction of a seed furrow which is produced by means of the seed furrow producing implements 51.

The row unit 50 additionally comprises a catching element 55, according to FIG. 2 in the form of a catching roller, wherein the grains may be shot in an accelerated manner by means of compressed air, for example, substantially tangentially against the catching element. The catching element 55 may be mounted via a quick change system (for example a clip system, a latching element system, a split pin system or a plug-in system) on the row unit 50. Additionally it may be provided that the catching element 55 is designed in order to be pushed against the soil (for example a seed furrow) by means of pretensioning (for example by being spring-loaded), wherein the pretensioning may be expediently adjustable in terms of its intensity.

Figure 3A:
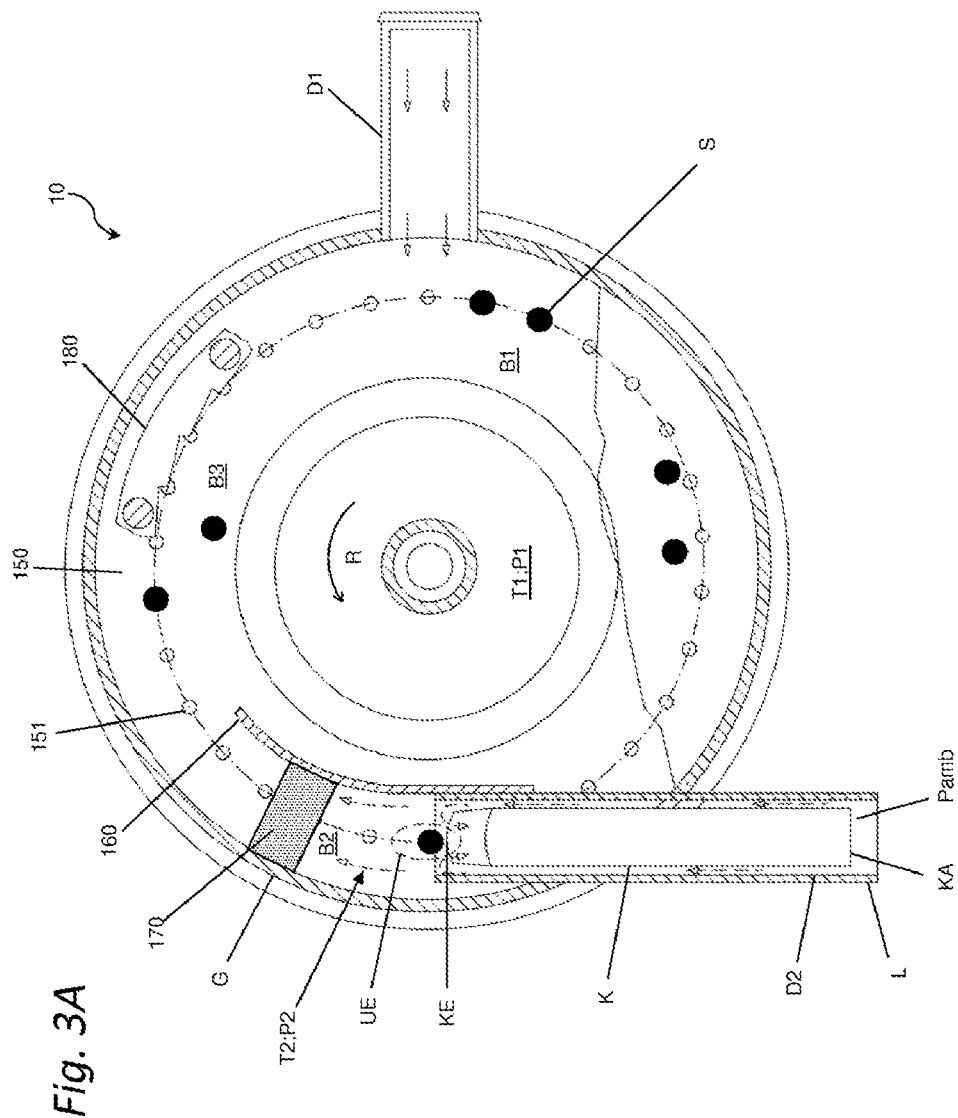
FIG. 3A shows a schematic side view in section of a singulation device with a first compressed air supply and a second compressed air supply, wherein the second compressed air supply is an air line surrounding the grain line.
Figure 3B:
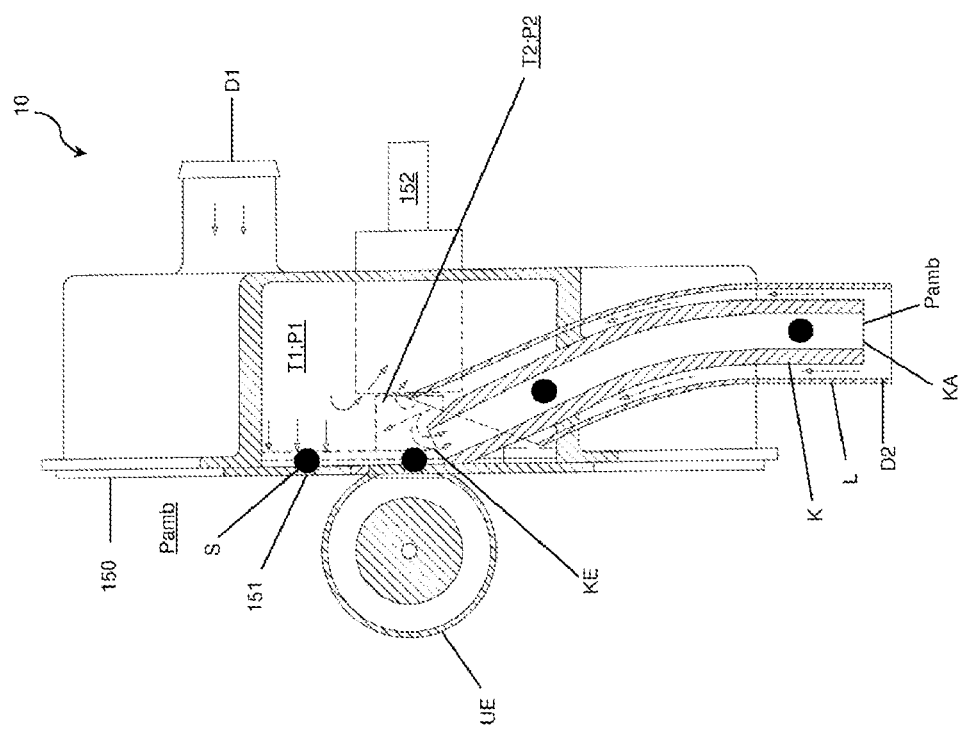
FIG. 3B shows a front view in section of a singulation device according to FIG. 3A.
Figure 4A:
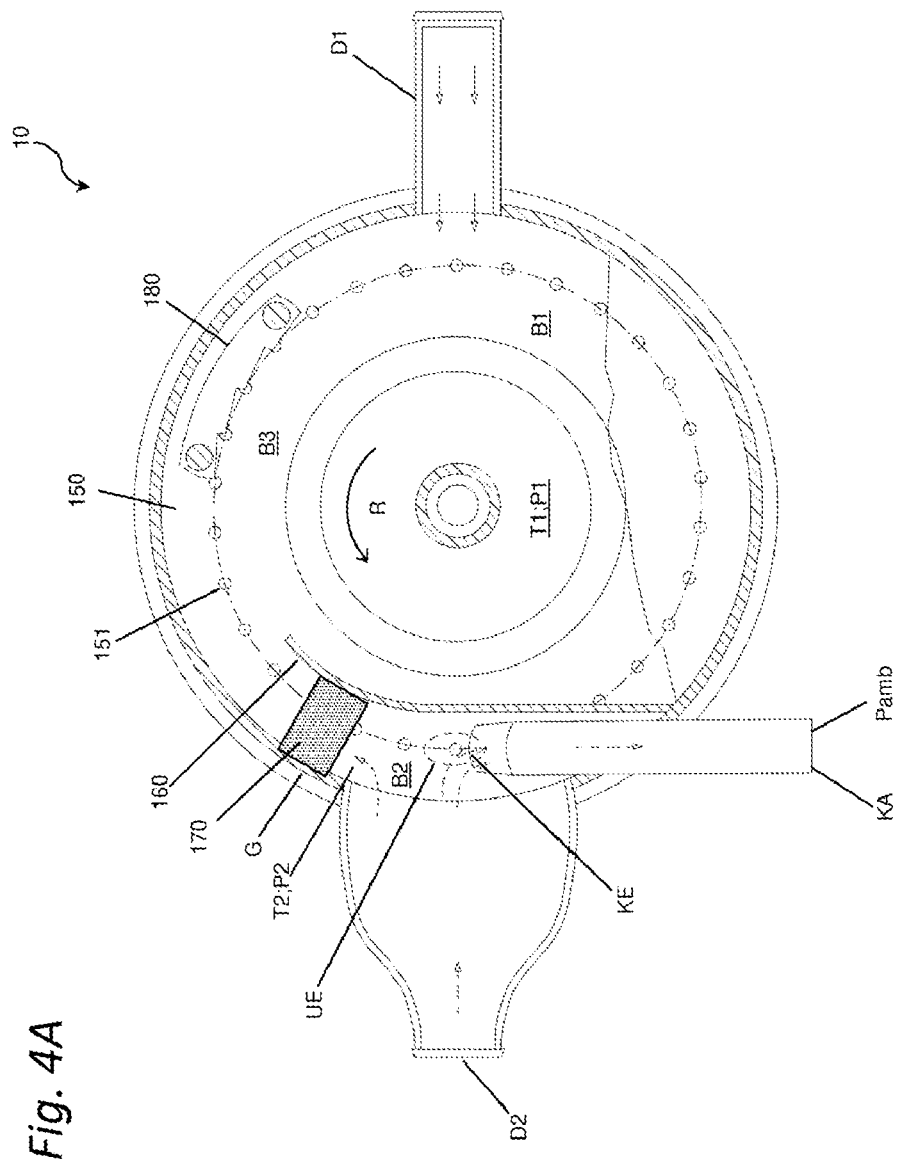
FIG. 4A shows a schematic side view in section of a singulation device with a first compressed air supply and a second compressed air supply, wherein the second compressed air supply is arranged transversely to the dispensing region
Figure 4B:
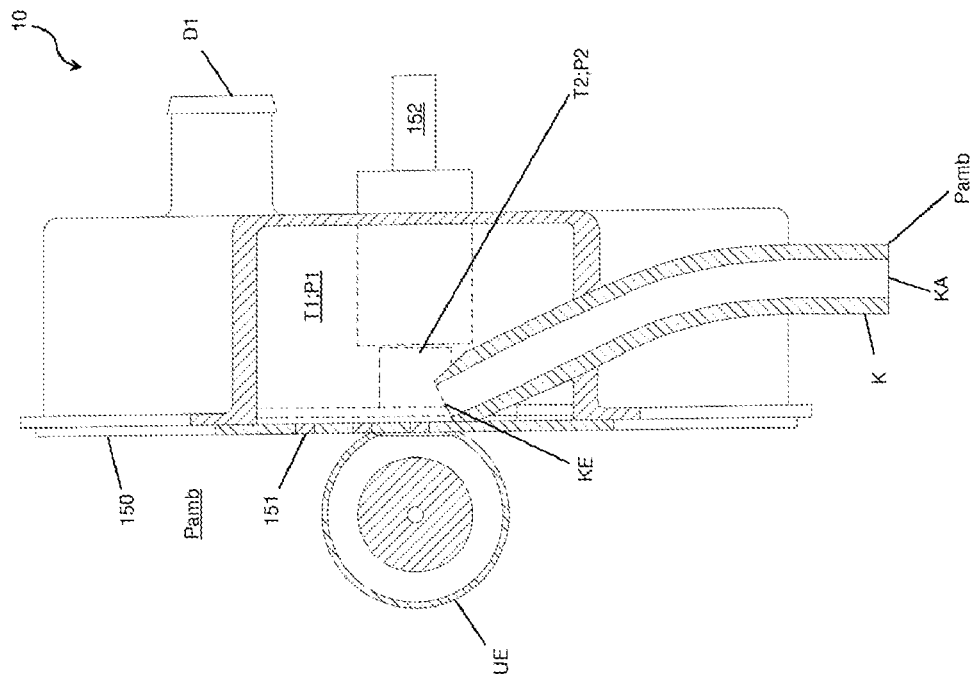
FIG. 4B shows a front view in section of a singulation device according to FIG. 4A.

Further details of possible variants of singulation devices 10 according to the invention are shown in FIGS. 3 and 4.

The singulation device 10 comprises a chamber B1 for receiving the grains S to be dispensed and a rotatable singulation element 150, wherein the chamber B1 is defined in at least one direction by a wall formed by the singulation element 150. By means of the singulation element 150 in each case grains S are transported from the chamber B1 to a dispensing region B2. Additionally a motorized drive 152 may be provided for generating the rotation of the singulation element 150.

The singulation device 10 additionally comprises a first compressed air supply D1 which opens into the chamber B1, the chamber B1 being able to be supplied thereby with compressed air for generating at least one pressure difference.

The singulation element 150 additionally comprises a plurality of recesses 151 for the grains S arranged at regular intervals along a circular path, wherein the grains S are able to be held in the recesses 151 on the basis of a pressure difference, by the compressed air provided by the first compressed air supply D1.

It should also be mentioned that the grains S shown in FIG. 3 are not shown at all points present during operation. Thus, for example according to FIG. 3A, grains S are present only on some recesses 151, whereas during operation of the singulation devices 10 grains S may be present and/or are present on all of the recesses 151.

Moreover, the exemplary embodiments of the singulation devices 10 comprise a dispensing region B2 for dispensing grains S in a singulated manner from the singulation element 150 into a grain line K. Wherein the grains S are transported through the grain line K, in particular in an accelerated manner by means of compressed air, and then distributed on or in the soil.

Thus the invention in each case provides a first stream of compressed air provided by means of the first compressed air supply D1 (see FIGS. 3 and 4 solid lines). Moreover, in each case the invention provides a second stream of compressed air provided by means of the second compressed air supply D2 (see FIGS. 3 and 4 dashed lines). Wherein the second compressed air supply D2 serves for preventing a flow of air from the chamber B1 into the grain line K and for the transport of the grains S through the grain line K in an accelerated manner by means of compressed air.

Wherein the compressed air provided in each case, i.e. the pressure level thereof and the flow rates of the flows of air thereof, in each case are defined and dimensioned such that a flow of air is not generated from the receiving region B1 into the grain line K, but the flow of air in the grain line K is implemented by the compressed air provided by means of the second compressed air supply D2.

According to FIGS. 3 and 4, for illustrating these connections the respective lines are shown with different lengths and directions, wherein the longer the line the greater the flow rate and vice versa.

For generating a transport of the grains S through the grain line K in an accelerated manner by means of compressed air, the singulation device 10 additionally comprises a second compressed air supply D2 which opens into the dispensing region and/or at least partially into the grain line K.

Wherein according to FIG. 3 the second compressed air supply D2 is formed by an air line L, which at least partially surrounds the grain line K, wherein to this end the air line L has a greater internal diameter and/or internal cross section than the external diameter and/or external cross section of the grain line K, and thus the second compressed air supply D2 may be implemented through the resulting gap. The air line L may additionally terminate flush with the grain line K or may be shorter than the grain line K.

In the air line L additionally a greater static pressure may be applied and smaller flow rates of a flow of air may be present therein than in a dispensing region B2 and/or in a grain line K. In particular, the pressure level in the air line L is greater than the pressure level and/or atmospheric pressure $P_{amb}$ at the outlet region KA of the grain line. By the resulting pressure difference between the air line L and the grain line K, a flow of air in the grain line K is generated, by which flow of air in the grain line K a transport of the grains S through the grain line K is generated in an accelerated manner by means of compressed air. In particular, the flow rate of the flow of air generated in the grain line K is greater than a flow rate of a flow of air from the chamber B1 in the direction of the dispensing region B2, whereby a flow of air from the chamber B1 is not generated in the grain line K.

For supplying the air line L with the corresponding compressed air, this air line may be connected to a compressed air source. Wherein the air line L to this end may have an additional connection and may be connected to a compressed air source (for example a fan, in particular a positive pressure fan) not shown here.

According to FIG. 4 the second compressed air supply D2 may be attached transversely to the dispensing region B2. Wherein the compressed air supply D2 in this case may also be connected to a compressed air source. In the second compressed air supply D2 additionally a greater static pressure may be applied and lower flow rates of a flow of air may be present therein than in a dispensing region B2 and/or in a grain line K. In particular, the pressure level in the second compressed air supply D2 is greater than the pressure level and/or the atmospheric pressure $P_{amb}$ at the outlet region KA of the grain line K. By the resulting pressure difference between the second compressed air supply D2 and the grain line K, a flow of air in the grain line K is generated, by which flow of air in the grain line K a transport of the grains S through the grain line K is generated in an accelerated manner by means of compressed air. In particular the flow rate of the flow of air generated in the grain line K is greater than the flow rate of a flow of air from the chamber B1 in the direction of the dispensing region B2, whereby a flow of air from the chamber B1 is not generated in the direction of the grain line K.

According to the invention it is provided that the compressed air, provided by means of the second compressed air supply D2, is defined and dimensioned such that a flow of air from the chamber B1 through the grain line K is prevented.

In particular, the compressed air respectively provided by means of the second compressed air supply D2 is defined and dimensioned such that low flow rates of a flow of air and high static pressure levels prevail therein, wherein this may be implemented, for example, by a large cross section (for example a flow cross section and/or line cross section) of the second compressed air supply D2.

In order to convey the grains S from the chamber B1 into the dispensing region B2, the singulation element 150 is rotatably driven by means of a motorized drive 152, in particular with variably changeable rotational speeds.

In order to achieve an even further improved prevention of the flow of air from the chamber B1 to the grain line K, additionally a partition 160 is provided, said partition together with a housing and/or with a housing part of the singulation device G thus forming the dispensing region B2. Thus, in particular, a pneumatic separation between the chamber B1 and the dispensing region B2 may be even further improved.

The compressed air provided by means of the second compressed air supply D2 forms, in particular, a flow barrier 170 and/or an air barrier for the compressed air provided in the chamber B1 by means of the first compressed air supply D1, wherein this flow barrier 170 according to FIGS. 3A and 4A may be formed upstream of the region of the dispensing of the grains from the singulation element 150 into the grain line K.

The singulation devices 10 are in each case designed such that the compressed air in the chamber B1 and in the dispensing region B2 are able to be changed at least substantially independently of one another, wherein this is achieved in that the total pressure T2 present in the dispensing region is greater than or equal to the total pressure T1 present in the chamber.

A pressure level P1 is generated by means of the first compressed air supply D1 in the chamber B1. Additionally it is provided that a pressure level P2 is generated by means of the second compressed air supply D2 in the dispensing region B2. In order to provide a flow barrier 170 between the chamber B1 and the grain line K it may be provided that the pressure level P1 is less than or equal to the pressure level P2, and/or that the cross sections of the first compressed air supply D1 and the second compressed air supply D2 are dimensioned such that the flow rates of the flows of air in the dispensing region B2 are always greater than in the chamber B1.

The grain line K comprises an inlet region KE which adjoins the dispensing region B2 and an outlet region KA which during operation of the singulation device 10 is arranged and/or runs in the vicinity of and/or in a seed furrow and/or in the soil, wherein additionally a catching element 55 may be arranged downstream of the outlet region KA, (see FIG. 2). The path of the grain line K between the inlet region KE and the outlet region KA may be at least partially arcuate and/or linear (see FIG. 2).

At the outlet region KA of the grain line K during operation of the singulation device 10 atmospheric pressure $P_{amb}$ is applied, i.e. the positive pressure here is 0 bar. Additionally on the singulation element 150, a lower pressure level prevails on an opposing side of the grains S than on the side of the grains S, in particular once again atmospheric pressure $P_{amb}$, whereby across the recesses 151 of the singulation element 150 a corresponding pressure difference (and/or flow transversely to the singulation element 150, see FIG. 3B) is generated, by which pressure difference grains S are held in the recesses 151.

For interrupting the pressure difference through the recesses 151 of the singulation element 150, a pressure difference interrupting element UE may be provided for the singulation device 10 and/or the singulation element 150 on the opposing side of the grains S in the dispensing region B2 which according to FIGS. 3 and 4 is in the form of a roller. Wherein it is additionally possible that the pressure difference interrupting element UE is arranged at least partially opposite a portion of a flow barrier present between the dispensing region B2 and the receiving region B1.

The singulation devices 10 additionally comprise a separating region B3, which separating region B3 is preferably spatially associated with the chamber B1. The separating region B3 comprises at least one separating device 180 of the singulation element 150, for removing excess grains S from the recesses 151. Wherein the separating region B3 is arranged such that, by means of the separating region B3, grains S released from the singulation element 150 are passed back again into the receiving region B1 and do not reach the dispensing region B2 (see FIG. 3A).

The separating device 180 according to FIGS. 3 and 4 may have one or more scraper blades, for example at least one leading edge, at least one projection, at least one metal plate or at least one roller for the mechanical removal of excess grains S, however also conceivable might be one or more brushes for the mechanical removing of excess grains S or one or more nozzles for the pneumatic removal of excess grains S.

The first compressed air supply D1 and the second compressed air supply D2 may be connected to a common compressed air source and/or to different compressed air sources. In the embodiment having different, and thus a plurality of, compressed air sources, the respective compressed air supply may thus be supplied with compressed air via a separate dedicated compressed air source.

Figure 5:
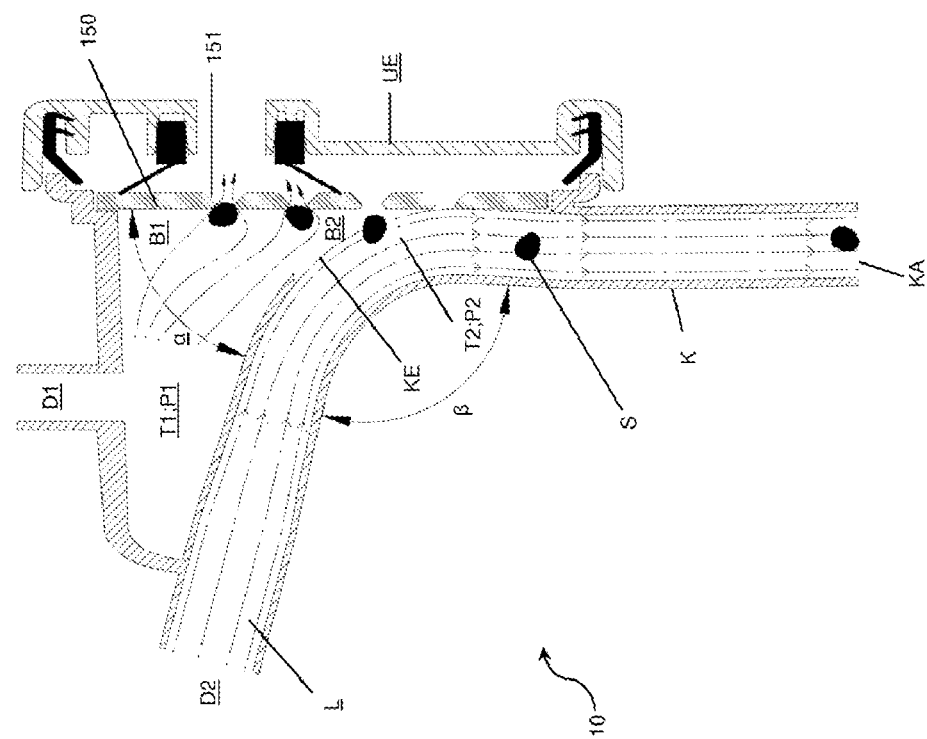
FIG. 5 shows a side view in section of a singulation device with a second compressed air supply arranged relative to the singulation element.

A further variant of a singulation device 10 according to the invention is shown in the side view in the section of FIG. 5. The second compressed air supply D2 in this case is attached transversely to the singulation element 150, in particular an air line L forming the second compressed air supply D2 is arranged relative to the singulation element 150, expediently at an angle α from the singulation element 150. According to the invention, in this case it may be provided that the angle α ranges between 0° and 90°, and/or ranges between 45° and 80°, wherein the angle α according to FIG. 5 is substantially 75°. Additionally the angle α in this case is provided directly on and/or adjacent to the singulation element 150.

According to the exemplary embodiment of FIG. 5, it is additionally provided that the air line L forming the second compressed air supply D2 is arranged at an angle β from the grain line, wherein the angle β in particular ranges between 90° and 170°, and according to FIG. 5 is substantially 105°. Additionally the angle β in this case is provided directly on and/or adjacent to the singulation element 150.

The air line L forming the second compressed air supply D2 and the grain line K are formed by a line formed by a continuous tube portion, wherein the line in the region of the singulation element 150 has a cutout forming the inlet region KE. The tube portion in this case is substantially L-shaped but also could be U-shaped or V-shaped. The inlet region KE of the grain line K may additionally be formed by an opening in a side wall of the line. The line is additionally arranged relative to the singulation element 150 such that the line undercuts the singulation element 150 and/or the singulation element 150 at least partially forms a side wall of the line. It may additionally be provided that the tube portion has a uniform cross section and/or changing cross sections (see FIG. 5).

The portion of the line which forms the second compressed air supply D2 and the portion of the line which forms the grain line K are arranged at an angle β to one another and have an at least partially arcuate transition region, wherein the transition region, in particular, may be located in the region of the inlet region KE, expediently at least opposing the inlet region KE. In particular it may be expediently provided that a Coanda effect is formed opposite the at least partially arcuate transition region.

According to the exemplary embodiment of FIG. 5 it is provided that the first compressed air supply D1 and the second compressed air supply D2 are arranged relative to one another such that the Coanda effect is formed therebetween, i.e. the flow of air generated by means of the first compressed air supply D1 acts on the flow of air generated by means of the second compressed air supply D2, such that it is deflected in the direction of the grain line K without the flow of air generated by means of the first compressed air supply D1 also being able to pass into the grain line K, see the flow lines of FIG. 5.

Expediently, in particular, it may be provided that the first compressed air supply D1 and the second compressed air supply D2 are arranged and/or dimensioned relative to one another such that in the inlet region KE the flow of air provided by the second compressed air supply D2 is conducted in the direction of the grain line K, due to a resulting Coanda effect.

In particular, additionally or alternatively it may be provided that the first compressed air supply D1 and the second compressed air supply D2 are arranged and/or dimensioned relative to one another such that in the inlet region KE the flow of air provided by the first compressed air supply D1 is not conducted in the direction of the grain line K, due to a resulting Coanda effect.

Expediently, in particular it may be provided that the Coanda effect is produced such that the flows of air and/or pressure levels provided by means of the first compressed air supply D1 and by means of the second compressed air supply D2 are arranged and/or dimensioned relative to one another such that the flow of air generated by means of the second compressed air supply D2 is conducted along the flow of air generated by means of the first compressed air supply D1 and/or comes into contact therewith. Expediently, this takes place in particular from a line forming the second compressed air supply D2 in the direction of the grain line K.

Additionally a greater static pressure may be applied in the second compressed air supply D2 and lower flow rates of a flow of air may be present therein than in a dispensing region B2 and/or in a grain line K. In particular, the pressure level in the second compressed air supply D2 is greater than the pressure level and/or atmospheric pressure $P_{amb}$ at the outlet region KA of the grain line K. By the resulting pressure difference between the second compressed air supply D2 and the grain line K, a flow of air is generated in the grain line K, by which flow of air in the grain line a transport of the grains S through the grain line K is generated in an accelerated manner by means of compressed air. In particular, therefore, the flow rate of the flow of air generated in the grain line K is greater than a flow rate of a flow of air out of the chamber B1 in the direction of the dispensing region B2, whereby a flow of air from the chamber B1 is not generated in the grain line K.

A pressure level P1 is generated in the chamber B1 by means of the first compressed air supply D1. Additionally, it is provided that a pressure level P2 is generated in the dispensing region B2 by means of the second compressed air supply D2. In order to provide a flow barrier 170 between the chamber B1 and the grain line K, it may be provided that the pressure level P1 is less than or equal to the pressure level P2, and/or that the cross sections of the first compressed air supply D1 and the second compressed air supply D2 are dimensioned such that the flow rates of the flows of air in the dispensing region B2 are always greater than in the chamber B1.

For interrupting the pressure difference at the recesses 151 of the singulation element 150, a pressure difference interrupting element UE may be associated with the singulation device 10 and/or the singulation element 150 on the opposing side of the grains S in the dispensing region B2. Wherein the pressure difference interrupting element UE may be configured in one piece or multiple pieces.

While the invention has been described with reference to specific exemplary embodiments, for the person skilled in the art it is obvious that various alterations may be carried out and equivalents may be used as replacements without departing from the scope of the invention. Additionally, numerous modifications may be carried out without departing from the assigned field. As a result, the invention is not intended to be limited to the disclosed exemplary embodiments but to encompass all of the exemplary embodiments which fall within the scope of the accompanying claims. In particular, the invention also claims protection for the subject matter and the features of the subclaims, independently of the claims provided by way of reference.

LIST OF REFERENCE NUMERALS

10 Singulation device
50 Row unit
51 Seed furrow generating implement
52 Seed furrow closing implement
53 Depth guidance element
54 Frame structure
55 Catching element
100 Agricultural machine
101 Support
102 Support
150 Singulation element
151 Recesses
152 Drive
160 Partition
170 Flow barrier
180 Separating device
B1 Chamber
B2 Dispensing region
B3 Separating region
S Grains
D1 First compressed air supply
D2 Second compressed air supply
K Grain line
KE Inlet region
KA Outlet region
T1 Total pressure receiving region
T2 Total pressure dispensing region
P1 Pressure level receiving region
P2 Pressure level dispensing region
$P_{amb}$ Atmospheric pressure
R Rotational direction of singulation element
L Air line
G Housing part of singulation device
UE Pressure difference interrupting element

The invention claimed is:

1. A singulation device, in particular for assembling on an agricultural row unit and for singulating grains on the basis of a pressure difference, comprising:
a chamber, preferably for receiving the grains,
a rotatable singulation element, wherein the chamber is delimited in at least one direction by a wall formed by the singulation element and wherein grains are transported from the chamber to a dispensing region by means of the singulation element, a first compressed air supply which opens into the chamber and by means of which the chamber can be supplied with compressed air in order to generate at least one pressure difference, wherein the singulation element has a plurality of recesses for the grains, and the grains can be held in the recesses on the basis of the pressure difference using the compressed air provided by the first compressed air supply, wherein grains are dispensed in a singulated manner into a grain line in the dispensing region, in order to distribute grains in a singulated manner on or in soil, a second compressed air line in order to prevent a flow of air out of the chamber into the grain line and in order to transport the grains through the grain line in an accelerated manner by means of compressed air, wherein the first compressed air supply and the second compressed air supply are arranged and/or dimensioned relative to one another such that in an inlet region the flow of air provided by the second compressed air supply is conducted in the direction of the grain line, due to a resulting Coanda effect.

2. The singulation device as claimed in claim 1, wherein the compressed air provided by means of the second compressed air supply forms a flow barrier for the compressed air provided in the chamber by the first compressed air supply in the direction of the grain line, wherein the flow barrier, in particular, forms a pneumatic flow barrier.

3. The singulation device as claimed in claim 1, wherein a total pressure present in the dispensing region is greater than or equal to a total pressure present in the chamber.

4. The singulation device as claimed in claim 3, wherein the total pressure present in the dispensing region is greater at least by a factor of 1.5 or 2 or 2.5 or 3 than the total pressure present in the chamber.

5. The singulation device as claimed in claim 3, wherein the total pressure in the dispensing region is defined such that the flow rate generated by the compressed air from the chamber in the direction of the dispensing region is reduced to a standstill.

6. The singulation device as claimed in claim 1, wherein the grain line comprises an inlet region and an outlet region, wherein atmospheric pressure is applied to the outlet region.

7. The singulation device as claimed in claim 1, wherein a first pressure level is generated in the chamber by means of the first compressed air supply and in that a second pressure level is generated in the dispensing region by means of the second compressed air supply wherein the first pressure level is less than or equal to the second pressure level.

8. The singulation device as claimed in claim 7, wherein the second pressure level is greater than or equal to the first pressure level and in that the first pressure level is greater than or equal to atmospheric pressure, but in particular greater than atmospheric pressure.

9. The singulation device as claim 7, wherein the flow barrier is generated pneumatically as a function of the first pressure level and the second pressure level and/or in that the flow barrier is generated as a function of a total pressure present in the chamber and a total pressure present in the dispensing region.

10. The singulation device as claimed in claim 1, wherein a pressure difference interrupting element is associated with the singulation element on the opposing side of the grains, wherein the pressure difference interrupting element is arranged at least partially opposite the resulting flow barrier and/or in the rotational direction of the singulation element downstream of this flow barrier.

11. The singulation device as claimed in claim 1, wherein the second compressed air supply is formed by an air line which at least partially surrounds the grain line, wherein the air line has a greater internal cross section than the external cross section of the grain line.

12. The singulation device as claimed in claim 11, wherein a greater static pressure and a lower flow rate of a flow of air prevail in the air line than in the dispensing region and/or in the grain line.

13. The singulation device as claimed in claim 1, wherein the second compressed air supply opens transversely into the dispensing region.

14. The singulation device as claimed in claim 1, wherein the chamber and the dispensing region are separated by a partition.

15. The singulation device as claimed in claim 1, wherein the compressed air and/or flow of air provided by means of the second compressed air supply are defined and dimensioned such that they have lower flow rates and a greater static pressure level than the flow rates of a flow of air and the static pressure levels generated by the compressed air and/or the flow of air provided thereby in the grain line.

16. The singulation device as claimed in claim 1, wherein a flow of air generated by the second compressed air supply is configured in order to generate a counterflow and/or a flow barrier relative to a flow of air from the chamber in the direction of the grain line.

17. The singulation device as claimed in claim 1, wherein the first compressed air supply and/or the second compressed air supply have one or more compressed air connections in the chamber and/or in the dispensing region and/or in the grain line, wherein the compressed air connections of the first compressed air supply and/or the second compressed air supply in each case are subjected to an equal or different pressure level and have equal or different cross sections.

18. The singulation device as claimed in claim 1, wherein a pressure level provided by means of the first compressed air supply and/or by means of the second compressed air supply and/or the flow cross sections are adjustable and/or regulatable in a variable manner, in particular are adjustable and/or regulatable in a variable manner by means of a control and/or regulating device.

19. The singulation device as claimed in claim 1, wherein the first compressed air supply and the second compressed air supply are attached to a common and/or to different compressed air sources, in particular assigned to an agricultural machine and/or the row unit.

20. The singulation device as claimed in claim 1, wherein an air line forming the second compressed air supply is arranged relative to the singulation element (150) and namely at an angle $\alpha$ from the singulation element, wherein the angle $\alpha$ ranges between 0° and 90°.

21. The singulation device as claimed in claim 1, wherein an air line forming the second compressed air supply is arranged at an angle $\beta$ from the grain line, wherein the angle $\beta$ ranges between 90° and 170°.

22. The singulation device as claimed in claim 1, wherein an air line forming the second compressed air supply is and the grain line are formed by a line which is formed by a tube portion which is continuous and/or curved in an arcuate manner.

23. The singulation device as claimed in claim 22, wherein the line has a cutout forming the inlet region and preferably the cutout is formed in the outer surface of the line and/or is arranged in the region of the singulation element, and/or the line has a uniform passage cross section or a passage cross section which continuously changes, and/or the singulation element partially forms a side wall of the line.

24. The singulation device as claimed in claim 23, wherein a portion of the line which forms the second compressed air supply and a portion of the line which forms the grain line are arranged at an angle β of preferably 90° and 170° to one another and/or these portions have an at least partially arcuate transition region.

25. A method for singulating grains in particular for singulation grains on the basis of a pressure difference, preferably carried out by a singulation device as claimed in claim 1, comprising at least the steps:

providing and preferably receiving grains by means of the chamber transporting the grains from the chamber to the dispensing region by means of the rotatable singulation element, wherein the chamber is defined in at least one direction by the wall formed by the singulation element generating at least the pressure difference in the chamber by means of the first compressed air supply which opens into the chamber, wherein the plurality of recesses on the singulation element are able to be hold the grains in the recesses on the basis of a pressure difference, by the compressed air provided by the first compressed air supply Dispensing singulated grains into the grain line in the dispensing region in order to distribute singulated grains on or in soil, Characterized by preventing a flow of air from the chamber into the grain line and by transporting the grains through the grain line in an accelerated manner by means of the compressed air provided by the second compressed air supply.

26. The method as claimed in claim 25, wherein the pressure level provided by means of the first compressed air supply and/or by means of the second compressed air supply and/or the flow cross sections thereof are adjustable and/or regulatable in a variable manner, in particular are adjustable and/or regulatable in a variable manner by means of a control and/or regulating device.

27. A row unit comprising a singulation device as claimed in claim 1.

28. The row unit as claimed in claim 27, wherein the row unit comprises a catching element, grains being able to be shot out of the grain line in an accelerated manner by means of compressed air counter to said catching element, and in that the catching element is mounted and/or designed via a quick change system in order to be pushed by means of pretensioning against the soil.

29. A singulation device, in particular for assembling on an agricultural row unit and for singulating grains on the basis of a pressure difference, comprising:

a chamber, preferably for receiving the grains, a rotatable singulation element, wherein the chamber is delimited in at least one direction by a wall formed by the singulation element and wherein grains are transported from the chamber to a dispensing region by means of the singulation element, a first compressed air supply which opens into the chamber and by means of which the chamber can be supplied with compressed air in order to generate at least one pressure difference, wherein the singulation element has a plurality of recesses for the grains, and the grains can be held in the recesses on the basis of the pressure difference using the compressed air provided by the first compressed air supply, wherein grains are dispensed in a singulated manner into a grain line in the dispensing region, in order to distribute grains in a singulated manner on or in soil, a second compressed air line in order to prevent a flow of air out of the chamber into the grain line and in order to transport the grains through the grain line in an accelerated manner by means of compressed air, wherein the first compressed air supply and the second compressed air supply are arranged and/or dimensioned relative to one another such that in the inlet region the flow of air provided by the first compressed air supply is not conducted in the direction of the grain line, due to a resulting Coanda effect.

30. A method for singulation of grains, in particular for singulation grains on the basis of a pressure difference, preferably carried out by a singulation device as claimed in claim 29, comprising at least the steps:

providing and preferably receiving grains by means of the chamber, transporting the grains from the chamber to the dispensing region by means of the rotatable singulation element, wherein the chamber is defined in at least one direction by the wall formed by the singulation element, generating at least the pressure difference in the chamber by means of the first compressed air supply which opens in to the chamber, wherein the singulation element has the plurality of recesses for the grains and the grains are able to be held in the recesses on the basis of the pressure difference, by the compressed air provided by the first compressed air supply dispensing singulated grains into the grain line in the dispensing region in order to distribute singulated grains on or in soil, characterized by preventing a flow of air from the chamber into the grain line and by transporting the grains through the grain line in an accelerated manner by means of the compressed air provided by the second compressed air supply.

* * * * *